United States Patent [19]

Honda et al.

[11] Patent Number: 4,567,672
[45] Date of Patent: Feb. 4, 1986

[54] COORDINATE MEASURING INSTRUMENT

[75] Inventors: Masataka Honda; Hideo Sakata, both of Kawasaki, Japan

[73] Assignee: Mitutoyo Mfg. Co., Ltd., Tokyo, Japan

[21] Appl. No.: 616,890

[22] Filed: Jun. 4, 1984

[30] Foreign Application Priority Data

Jun. 16, 1983 [JP] Japan .................................. 58-108320
Jun. 16, 1983 [JP] Japan .................................. 58-108321

[51] Int. Cl.$^4$ ............................................. G01B 7/28
[52] U.S. Cl. ........................................................ 33/559
[58] Field of Search ............. 33/174 L, 174 P, 172 E, 33/169 R, 23 K, 174 R, 172 D, 169 C, 551, 552, 556–559

[56] References Cited

U.S. PATENT DOCUMENTS

| | | | |
|---|---|---|---|
| 2,665,492 | 1/1954 | Freimark | 33/172 D |
| 3,512,261 | 5/1970 | Viollet | 33/169 C |
| 3,785,058 | 1/1974 | Egli | 33/172 D |
| 4,288,925 | 9/1981 | McMurtry | 33/174 L |
| 4,451,987 | 6/1984 | Cusack | 33/174 L |
| 4,477,976 | 10/1984 | Suzuki | 33/174 L |

Primary Examiner—Willis Little
Attorney, Agent, or Firm—Flynn, Thiel, Boutell & Tanis

[57] ABSTRACT

A coordinate measuring instrument in which a touch signal probe is brought into contact with a workpiece to be measured and a contour of the workpiece is measured in response to an electric signal on the basis of the aforesaid contact.

The touch signal probe used in this measuring instrument comprises a first member held on a main body of the probe and a second member rotatably provided on the first member and having a contact member. The second member has a forward end constantly positioned on the rotary axis of the second member irrespective of any position of rotation of the second member.

6 Claims, 8 Drawing Figures

COORDINATE MEASURING INSTRUMENT

BACKGROUND OF THE INVENTION

1. Field of the Invention

This invention relates to coordinate measuring instruments, and more particularly to improvements in a touch signal probe used in this coordinate measuring instrument, for sensing a contact with a workpiece to be measured.

2. Description of the Prior Art

In general, the touch signal probe utilized in the coordinate measuring instrument is classified into two types including a contact type for electrically detecting a mechanical displacement when a contact element comes into contact with the workpiece and a conduction type for detecting an electrical conduction with the workpiece. Each of the touch signal probes is of such an arrangement that a sensor having the contact element thereon is held on a main body of probe through an origin returning mechanism in a manner to be swingable and restorable to a predetermined posture.

Now, with the conventional touch signal probe, in order to change a direction of the contact element contacting the workpiece, such a change in posture should be made so that the probe itself is replaced by another one or the probe is inclined to a main body of the measuring instrument.

However, in changing the direction of contact through the above-described methods, the posture cannot be easily changed, due to the accuracy of coupling of a probe shank to the main body of the measuring instrument, and the contacting portion of the contact element being varied in the positional relationship with the main body of the measuring instrument. As the result, each time the direction of contact of the contact element is changed, a so-called origin check works or procedure should be made to specify a system of coordinates in the direction of contact thus changed. This complicates the working, and further, makes it necessary to provide a device for changing to absolute coordinates, thus rendering it uneconomical. Particularly, in the case of measuring the continuous curved surfaces such as a mold for molding eyeglass frames and the like, the frequency of changes of the contacting directions is high, thereby presenting such a disadvantage that the measured data become rough.

In fact, if the contact element is formed into a ball shape, then the omnidirectional characteristics may be obtained. However, it becomes necessary to provide a device for correcting a diameter of the ball. In particular, it is difficult to install the main body of the measuring instrument and the probe concentrically with each other, whereby the origin check works should be carried out each time the posture is changed, thus not enabling to settle the matter radically.

SUMMARY OF THE INVENTION

The present invention has been developed to obviate the above-described disadvantages of the prior art and has as its object the provision of a coordinate measuring instrument provided with a touch signal probe capable of easily changing a posture and dispensing with an origin check works even when changed to a desired posture.

To this end, the present invention contemplates that, in a coordinate measuring instrument provided with a touch signal probe being of such an arrangement that a sensor is held on the main body of the probe by the origin returning mechanism in a manner to be displaceable and restorable to a predetermined posture and the instant the sensor comes into contact with the workpiece is detected as an electrical signal. The sensor is divided into two members including a first member held on the main body of the probe by the origin returning mechanism and a second member having the contact element is rotatably mounted on the first member. The contact element is constructed such that, when the second member is rotated, the contact element end of the contact element to be brought into contact with the workpiece, is constantly positioned on a rotary axis of the second member and changeable in its direction and fixing means for fixing a position of rotation of the second member relative to the first member is provided.

In short, even if the posture of the main body of probe is not changed, the contact element, i.e. the second member is rotated relative to the first member, so that the contact element end can be easily changed in its direction. Further, the contact element end is positioned on the rotary axis of the second member, so that the origin check works due to the change in posture can be dispensed with.

DETAILED DESCRIPTION OF THE PREFERRED EMBODIMENT

Description will hereunder be given of one embodiment of the present invention with reference to the drawings.

Figure 1:
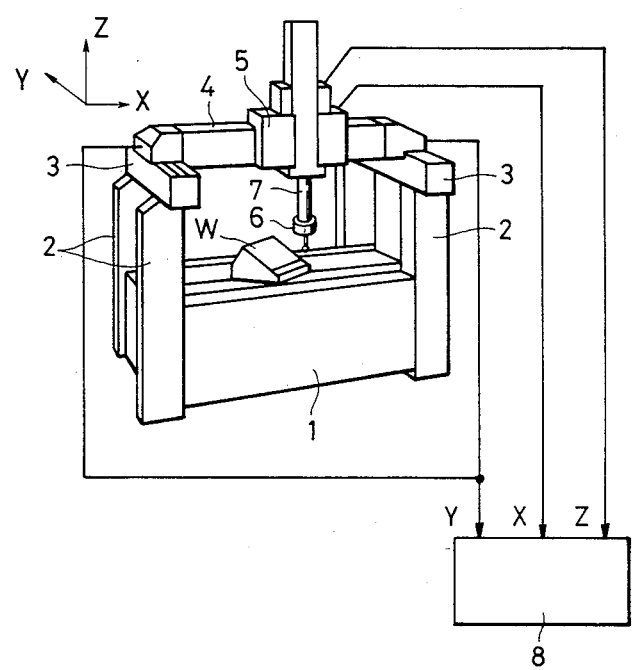
FIG. 1 is a perspective view showing the coordinate measuring instrument using the touch signal probe according to the present invention.

FIG. 1 shows the outer appearance of the coordinate measuring instrument according to the present invention. In the drawing, a bare pedestal or surface plate 1, having rested thereon a workpiece W to be measured, is provided at each opposite side thereof with a horizontally aligned support beam 3 supported by a pair of upstanding supports 2. A lateral beam 4 is mounted on and extends between the support beams 3 and is supported for movement in the longitudinal direction (direction of the Y axis) on the beams 3. A slider 5 is movable along the length of the lateral beam 4 in the lateral direction (direction of the X axis). A probe shaft 7 is provided on the slider 5 and has at the bottom end thereof a touch signal probe 6 which is movable in the vertical direction (direction of the Z axis). In this coordinate measuring instrument, when the touch signal probe 6 moves in the tridimensional directions to come into contact with the workpiece W, at which a touch signal is outputted, various movement or position values of the touch signal probe 6, i.e. a position value of the slider 5 in the direction of the X axis, a position value of the lateral beam 4 in the direction of the Y axis and a position value of the probe shaft 7 in the direction of the Z axis, are read from respective position detectors, not shown, electrically processed and digitally indicated in an indicator 8.

Figure 2:
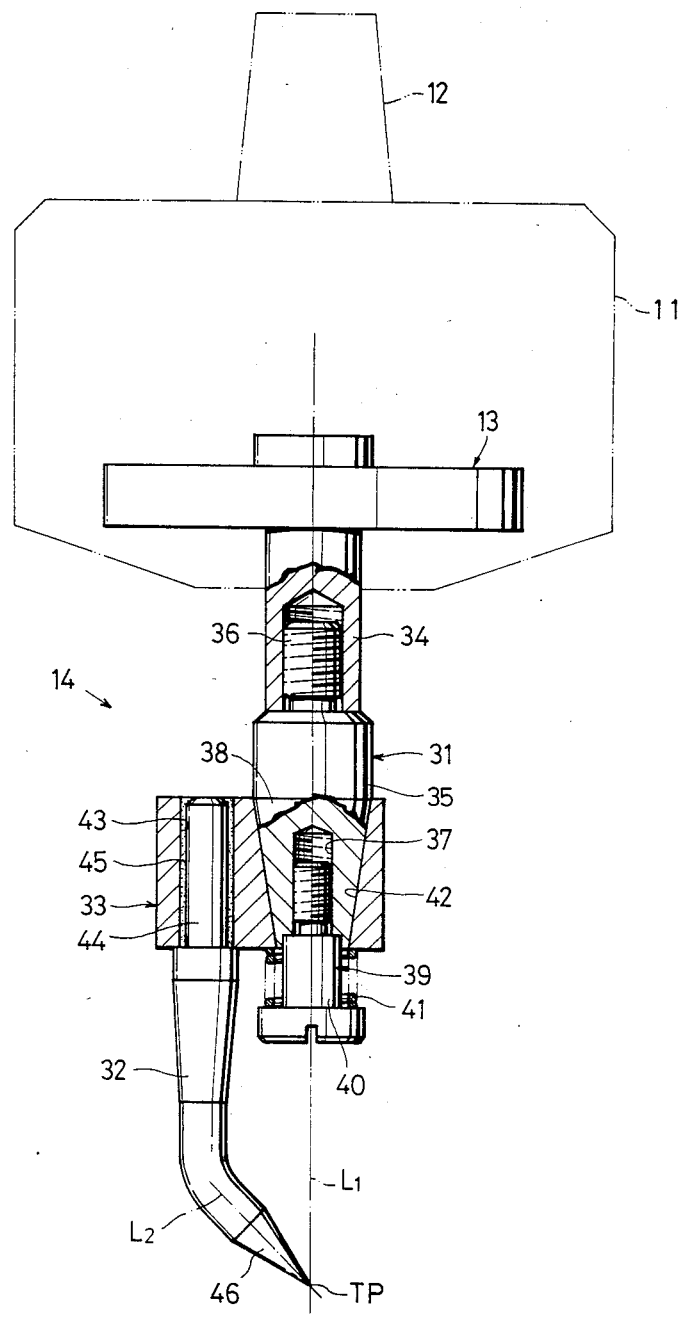
FIG. 2 is a sectional view showing the essential portions of the touch signal probe.
Figure 3:
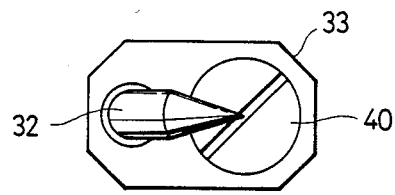
FIG. 3 is the bottom view thereof.
Figure 4:
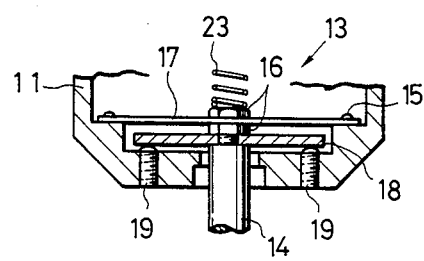
FIG. 4 is a sectional view showing the origin returning mechanism.
Figure 5:
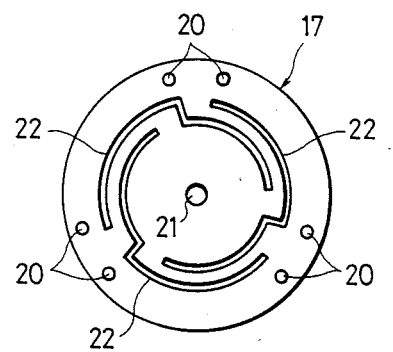
FIG. 5 is a plan view showing the leaf spring.

FIG. 2 shows the front surface of the touch signal probe 6 and FIG. 3 shows the bottom surface of the probe 6, respectively. In these drawings, the main body 11 of the probe is integrally formed with a shank 12 detachably fixed to the probe shaft 7 and held thereon by an origin returning mechanism 13 having thereon a sensor 14 adapted to contact the workpiece W in a manner to be displaceable and restorable to a predetermined posture. As shown in FIG. 4 for example, the origin returning mechanism 13 comprises: a disc-shaped leaf spring 17 affixed at the peripheral edge portion thereof to the interior of the main body 11 of the probe by screws 15 and holding, at the central portion thereof, the top end portion of the sensor 14 through a nut 16; a position regulating plate 18 secured to the top end portion of the sensor 14, the plane of which plate lies perpendicular to the axis of the sensor 14; and a spring 23 for urging the position regulating plate 18, by its engagement with the nut 16, against three equidistantly spaced screws 19 threadably coupled to and on a circumference concentric with the main body 11 of the probe centered about the axis of the sensor 14. As shown in FIG. 5, the leaf spring 17 is formed at the peripheral edge portion thereof with a plurality of mounting holes 20, through which the screws 15 are inserted, and at the central portion thereof with a holding hole 21 for holding the top end portion of the sensor 14 by the nut 16, respectively, and further, formed circularly arcuate kerfs 22 between the mounting holes 20 and the holding hole 21. With this arrangement, the sensor 14 is disposed such that, when the sensor 14 is not in contact with the workpiece W, the position regulating plate 18 is held in a state where the plate 18 is in contact with all of the screws 19, whereas, when the sensor 14 is brought into contact with the workpiece W, the position regulating plate 18 is separated from any one of the screws 19 and displaced into an inclined state.

On the other hand, the sensor 14 comprises a first member 31 and a second member 33 having a contact element 32 thereon. The first member 31 includes a first stem 34 and a second stem 35 connected to the bottom end of the first stem 34. The second stem 35 is formed at the upper end portion thereof with external threads 36 to be threadably coupled to the first stem 34 at the lower end portion thereof and with the internal threads 37 thereon. The outer periphery of the bottom end portion of the second stem has a tapered shaft 38 progressibly decreasing in the diameter and in a downwardly direction. Furthermore, the second member 33 is rotatably coupled to the tapered shaft 38 of the second stem 35, and fixably mounted to a desirably rotary position by fixing means 39. The fixing means 39 comprises a spring receiving shaft 40 threadably coupled to the internal threads 37 on the second stem 35. A spring 41 is confined between a head of the spring receiving shaft 40 and the bottom surface of the second member 33, for continually urging the second member 33 in the direction of diameter increase of the tapered shaft 38, namely, downwardly. The second member 33 has formed therein a tapered hole 42 conforming in shape to the shape of the tapered shaft 38 of the second stem 35. A holding hole 43 is provided a predetermined distance apart from the center of the tapered hole 42. A proximal end portion 44 of the contact element 32 is loosely coupled into the holding hole 43 and solidly secured thereto by a bonding agent 45. The contact element end 46 of the contact element 32 is formed into a conical shape, wherein a vertex TP is positioned on a rotary axis $L_1$ of the second member 33 and the axis $L_2$ thereof intersects the axis $L_1$ at a predetermined angle. With this arrangement, the vertex TP of the contact element end 46 is constantly held on the rotary axis $L_1$ in a state where the second member 33 is rotated to a desired rotary position with respect to the first member 31.

Not shown though, when the contact element end 46 of the contact element 32 comes into contact with the workpiece W to incline the first member 31, a contact point, which closes or opens in accordance with the inclination of the first member 31, opens to output a touch signal. For example, if the contact point is provided between the position regulating plate 18 and the screws 19, then, when the position regulating plate 18 is separated from any one of the screws 19 due to the inclination of the first member 31, a touch signal is outputted.

With the above-described arrangement, in carrying out the measurement, the second member 33 is grasped by hand and pushed to a position downwardly of the second stem 35 against the spring 41, thereafter, rotated about the axis of the second stem 35, so that the contact element end 46 of the contact element 32 becomes substantially perpendicularly opposed to a measured surface on the workpiece W. Here, if the hand is removed from the second member 33, the second member 33 is then restored upwardly by the spring 41, and affixed in a state of being coupled to the tapered shaft 38 of the second stem 35. Then the contact element end 46 of the contact element 32 is positioned at the predetermined position relative to the rotary axis $L_1$ again. In consequence, even if the second member 33 is rotated about the second stem 35 to change the posture of the contact element 32, i.e. the direction of the contact element with respect to the workpiece W, the contact element end 46 of the contact element 32 is constantly positioned at the predetermined position on the rotary axis $L_1$ of the second member 33, whereby the contact element end 46 has no displacement relative to the respective displacement detectors for detecting the position values in the directions of the axes X, Y and Z, so that no origin check works are necessitated.

Then, in the state where the second member 33 is affixed to the second stem 35, if the touch signal probe 6 is moved in the tridimensional directions with no origin check works being carried out to thereby bring the contact element end 46 of the contact element 32 into contact with the workpiece W, then, through a touch signal at the time when the contact element end 46 comes into contact with the workpiece W, position values of the touch signal probe 6, i.e. a position value of the slider 5 in the direction of the X axis, a position value of the lateral beam 4 in the direction of the Y axis and a position value of the probe shaft 7 in the direction of the Z axis are read from the respective displacement detectors and digitally indicated by the indicator 8. In this case, the contact element end 46 of the contact element 32 comes into contact with the workpiece W, and, even if there occurs an overstroke in the same direction as described above, a displacement of the first member 31 is absorbed by the origin returning mechanism 13, so that a possibility of the touch signal probe 6 being damaged can be eliminated.

When the contact element end 46 of the contact element 32 is successively changed in direction in accordance with the measured surface of the workpiece W as described above, and thereafter, the contact element end 46 is brought into contact with the measured surface of the workpiece W, then the contour of the workpiece W can be measured.

In consequence, according to this embodiment, the first member 31 is held on the main body 11 of the probe movably provided on the coordinate measuring instrument by the origin returning mechanism 13 in a manner to be inclinable and restorable to the predetermined posture, this first member 31 is provided thereon with the second member 33 having the contact element 32 in a manner to be rotatable and fixable through the fixing means 39, and the contact element end 46 of the contact element 32 is formed into the conical shape, wherein the vertex TP thereof is positioned on the rotary axis $L_1$ and the axis $L_2$ thereof intersects the rotary axis $L_1$, whereby, if the second member 33 is rotated relative to the first member 31 in accordance with the measured surface of the workpiece W, with the main body 11 of the probe being affixed to the coordinate measuring instrument, then the contact element end 46 of the contact element 32 can be desirably changed in direction. Because of this, there is no need to replace the touch signal probe with a new one for the main body of the coordinate measuring instrument or change the posture of the main body of the touch signal probe, so that the posture can be easily changed and the portion of the mounting for the main body 11 of the probe to the coordinate measuring instrument should not be finished with high accuracy. Moreover, the vertex TP of the contact element end 46 is constantly positioned on the rotary axis $L_1$ of the second member 33 and no relative displacement therebetween occurs, whereby there is no need of carrying out the origin check works, so that the measurement at the same coordinates can be carried out.

This can offer such advantages that, even if the workpiece W has a curved surface such as a continuous curved surface, the measurement can be carried out efficiently and with high accuracy. Moreover, since no coordinate changing mechanism is required, the cost for installation is low. Needless to say, the provision of the coordinate changing mechanism makes it possible to expect a great expansion in the forms of use. On the other hand, in comparison between the contact element end formed into a ball shape, with the contact element end according to the present invention, the latter does not need a calculating function for a ball diameter correction, so that the manufacturing cost is advantageously low.

Furthermore, the first member 31 is provided with the tapered shaft 38 and the second member 33 is provided with the tapered hole to be coupled to the tapered shaft 38, respectively, and the second member 33 is biased by the spring 41 in the direction of diameter increase, whereby, if the second member 33 is moved by hand against the spring 41 in the direction of diameter decrease of the tapered shaft 38, the second member 33 is rotated in this state, and thereafter, when the hand is removed from the second member 33, then the second member 33 is fixed in a state of being coupled to the tapered shaft 38, so that the contact element 32 secured to the second member 33 can be easily changed in direction. Moreover, the first member 31 and the second member 33 are coupled to each other through the tapered shaft 38 and the tapered hole 42, whereby, even if a change in posture is effected, the vertex TP of the contact element end 46 can be constantly held at the predetermined position.

Figure 6:
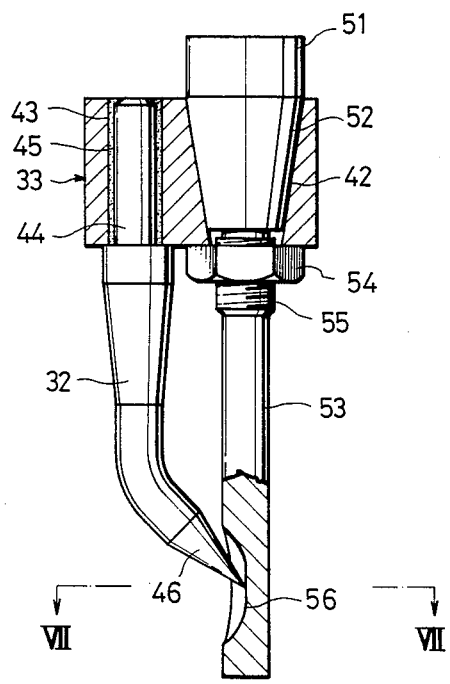
FIG. 6 is a sectional view showing the state where the contact element is mounted on the second member.
Figure 7:
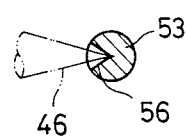
FIG. 7 is a sectional view taken along the line VII—VII in FIG. 6.

Furthermore, the second member 33 is to be formed therein with the holding hole 43, the proximal end portion 44 of the contact element 32 is to be loosely coupled into the hole 43, and thereafter, fixed by the bonding agent 45. In consequence, in the state where the proximal end portion 44 of the contact element 32 is loosely coupled into the holding hole 43 and the contact element 46 of the contact element 32 is positioned on the rotary axis of the second member 33, i.e. the center axis of the tapered hole 42, if the proximal end portion 44 of the contact element 32 is solidly secured to the holding hole 43 by the bonding agent 45, then, even if a dimension between the holding hole 43 and the tapered hole 42 is positioned with not so high accuracy, the contact element end 46 of the contact element 32 can be accurately positioned on the rotary axis of the second member 33. In this case, if a jig 51 shown in FIGS. 6 and 7 is used, then the positioning working can be easily carried out. The jig 51 is constructed such that a threaded portion 55 to be threadably coupled to a nut 54 is formed on the proximal end portion of a shaft 53 having a tapered shaft 52 to be coupled into the tapered hole 42 of the second member 33, and a cut-in groove 56 reaching the center of the shaft 53 is formed at one side of the forward end portion of the shaft 53. In consequence, in a state where the tapered shaft 52 is coupled into the tapered hole 42 of the second member 33, the nut 54 is threadably coupled to the threaded portion 55 to set the jig 51 to the second member 33, and thereafter the contact element end 46 of the contact element 32, the proximal end portion 44 of which is loosely coupled into the holding hole 43 is positioned in the cut-in groove 56, if the bonding agent 45 is poured in, then, the contact element end 46 of the contact element 32 can be set on the rotary axis of the second member 33.

In working, the origin returning mechanism 13 need not necessarily be limited to the construction described in the above embodiment. In short, any construction may be adopted only if it is a mechanism, in which, after a predetermined overstroke is absorbed and the free condition is restored, the contact element is returned to the initial state again.

Furthermore, as a system for detecting a contact between the contact element and the workpiece, a so-called conduction type for sensing an electrical conduction with the workpiece may be adopted in addition to the contact point type for on-off operating the contact point by the utilization of a displacement of the sensor 14 caused by the contact with the workpiece as described in the above embodiment.

Furthermore, there may be prepared a plurality of types of the second members 33 having contact elements different in shape from one another, and each of the second members may be selectively mounted to the first member 31 in accordance with the measured surfaces of the workpiece.

In this case, the contact element end 46 of the contact element 32 may be detachably formed on the contact element and a plurality of types of contact element ends 46 different in vertex of the conical shape from one another may be selectively secured to the contact element.

Figure 8:
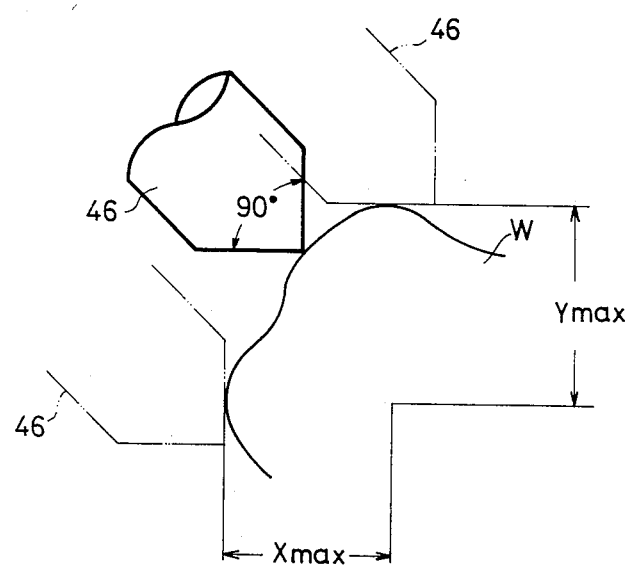
FIG. 8 shows a modified example of the contact element.

Furthermore, the shape of the contact element end 46 need not necessarily be limited to the conical shape illustrated in the above embodiment, but may be of a pyramidal shape for example. However, in this case, if the contact element end 46 has a shape having surfaces incorporating the rotary axis of the second member 33 and the axis perpendicularly intersecting the rotary axis, respectively, e.g. a conical shape having a vertical angle of 90°, or a shape having at least two planar surfaces perpendicularly intersecting each other as shown in FIG. 8, then the planar surface, or conical or pyramidal surface is brought into contact with the largest projecting portion of the workpiece W, so that the largest value of projection can be easily obtained.

As has been described hereinabove, the present invention can provide the coordinate measuring instrument provided with a touch signal probe in which the posture can be easily changed, and, even if the posture is changed to a desired one, the origin check works are not required.

We claim:

1. In a coordinate measuring instrument including a touch signal probe means having a sensor which is movably supported on a main body of a touch signal probe means on said measuring instrument, said touch signal probe means including means for indicating when said sensor comes into contact with a workpiece to be measured and indicating position values of a contour on said workpiece on the basis of said contact, the improvement comprising wherein said sensor comprises:

a first member supported on said main body, said first member having an elongated tapered shaft decreasing in diameter away from said main body and being concentric with a rotary axis;

a second member including a tapered hole therein conforming in shape to the shape of said tapered shaft, said second member having a contact element with a contact element end thereon to be abutted against said workpiece, said contact element end being positioned to coincide with said rotary axis;

a fixing means for fixing said second member to said first member, said fixing means comprising a spring receiving shaft on said first member at the small diameter end thereof and being oriented on said rotary axis, and a spring confined between said spring receiving shaft and said second member, whereby said spring urges the conforming tapered surfaces of said tapered shaft and tapered hole into frictionally locking engagement, a separation of said surfaces against the urging of said spring effecting an unlocking of said first and second members to facilitate a relative movement therebetween and a reorienting of said contact element end; and origin returning means on said main body and secured to said first member for yieldably permitting said tapered surfaces on said first and second members to move out of concentricity with said rotary axis and continually urging said tapered surfaces into concentric relation with said rotary axis.

2. A coordinate measuring instrument as set forth in claim 1, wherein said contact element end is of a conical shape.

3. A coordinate measuring instrument as set forth in claim 1, wherein said contact element end is of a shape having surfaces incorporating said rotary axis and another axis perpendicularly intersecting said rotary axis.

4. A coordinate measuring instrument as set forth in claim 1, wherein said contact element is mounted on said second member by a bonding agent in such a condition that, when said fixing means lockingly fixes said first and second members, said contact element end coincides with said rotary axis.

5. In a coordinate measuring instrument including a touch signal probe means having a sensor which is movably supported on a main body probe means, said touch signal probe means including means for indicating when said sensor comes into contact with a workpiece to be measured and indicating position values of a contour on said workpiece on the basis of said contact, wherein the improvement comprises:

said sensor including a first member and a second member;

origin returning means mounted on said main body for providing an indication when said sensor comes into contact with said workpiece, said returning means comprising a first resilient means secured to said main body and having a first resilient portion thereon, a position regulating member, support means on said main body for supporting said position regulating member in a first origin position thereof, securing means for securing said first member to said first resilient portion of said first resilient means and to said position regulating member, and second resilient means for continually urging said position regulating member to said first origin position to thereby effect a placement of said first member in an origin position;

a contact element on said second member;

means for rotatably supporting said second member on said first member;

a contact element end on said contact element positioned to coincide with a rotary axis in all positions of said second member when said position regulating member is in said first origin position; and releasable fixing means for releasably fixing the position of said second member relative to said first position;

whereby an engagement of said contact element end with said workpiece will effect a movement of said first and second members and, thence said sensor relative to said main body to displace said position regulating member from said origin position and relative to said support means to thereby provide an indication when said contact element end comes into contact with said workpiece.

6. A coordinate measuring instrument according to claim 5, wherein said support means includes plural screws equidistantly spaced on said main body.

* * * * *